US012629837B2

(12) United States Patent
Zhao et al.

(10) Patent No.: US 12,629,837 B2
(45) Date of Patent: May 19, 2026

(54) METHOD FOR ROBOT ASSEMBLY SKILL LEARNING

(71) Applicant: FANUC CORPORATION, Yamanashi (JP)

(72) Inventors: Yu Zhao, Santa Clara, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 272 days.

(21) Appl. No.: 18/356,525

(22) Filed: Jul. 21, 2023

(65) Prior Publication Data

US 2025/0026018 A1      Jan. 23, 2025

(51) Int. Cl.
B25J 9/16          (2006.01)

(52) U.S. Cl.
CPC ............. B25J 9/1687 (2013.01); B25J 9/163 (2013.01)

(58) Field of Classification Search
CPC ......... B25J 9/1687; B25J 9/163; B25J 9/1602
See application file for complete search history.

(56) References Cited

U.S. PATENT DOCUMENTS

| | | |
|---|---|---|
| 7,177,722 B2 | 2/2007 | Kato et al. |
| 9,403,273 B2 | 8/2016 | Payton et al. |
| 9,597,802 B2 | 3/2017 | Zhang et al. |
| 10,502,253 B2 | 12/2019 | Watanabe et al. |
| 2018/0207798 A1* | 7/2018 | Tsuzaki ................... B25J 13/085 |

| | | | |
|---|---|---|---|
| 2018/0222057 A1* | 8/2018 | Mizobe .................... B25J 9/161 |
| 2020/0030970 A1* | 1/2020 | Mariyama .............. G06N 3/092 |
| 2021/0107142 A1* | 4/2021 | Solowjow .............. B25J 9/1633 |
| 2022/0036186 A1* | 2/2022 | Refaat ...................... G06N 3/088 |
| 2022/0198225 A1* | 6/2022 | Choi ....................... G06F 17/18 |
| 2022/0371185 A1* | 11/2022 | Ranjbar ............. G05B 19/4155 |
| 2023/0041035 A1* | 2/2023 | Harsha ................... G06N 3/006 |
| 2023/0109398 A1* | 4/2023 | Kranski ................ B25J 9/1615 |
| | | 700/250 |
| 2023/0173673 A1 | 6/2023 | Zhao et al. |
| 2024/0091934 A1* | 3/2024 | Ju .......................... B25J 13/089 |

FOREIGN PATENT DOCUMENTS

| | | |
|---|---|---|
| CN | 112847235 B | 9/2022 |
| JP | 6651636 B2 | 2/2020 |

\* cited by examiner

*Primary Examiner* — Abby Lin
*Assistant Examiner* — Danielle M Jackson
(74) *Attorney, Agent, or Firm* — Shumaker, Loop & Kendrick, LLP; John A. Miller

(57)          ABSTRACT

A method and system for robot skill learning applicable to high precision assembly tasks employing a compliance controller. An actor-critic reinforcement learning controller is coupled to the compliance controller, where an actor neural network provides target position adjustment action data to the compliance controller based on robot state data feedback, and a critic neural network is used to train the actor. The critic neural network receives the robot state data feedback and reward data from the robot, along with the action data from the actor, and correlates optimal actions associated with states in order to maximize the reward. The critic then adjusts the parameters of the actor so that the actor produces effective actions in response to the state data, leading to rapid and reliable completion of the assembly task by the compliance controller/robot system. The critic is no longer used after the actor is adequately trained.

20 Claims, 10 Drawing Sheets

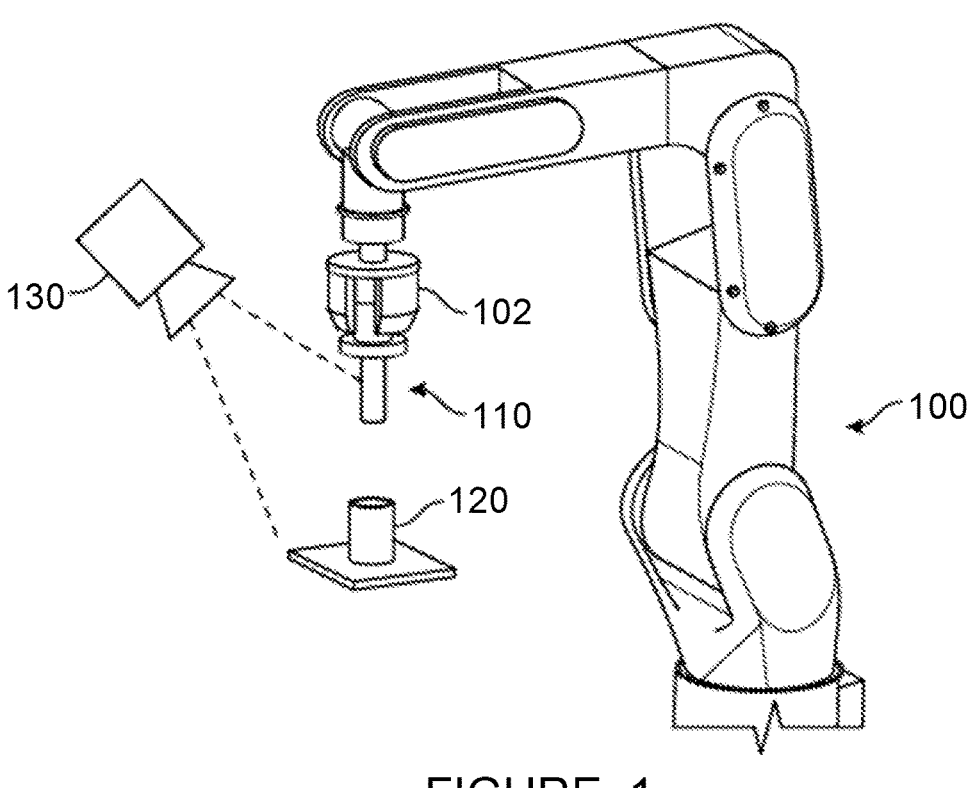
FIGURE 1
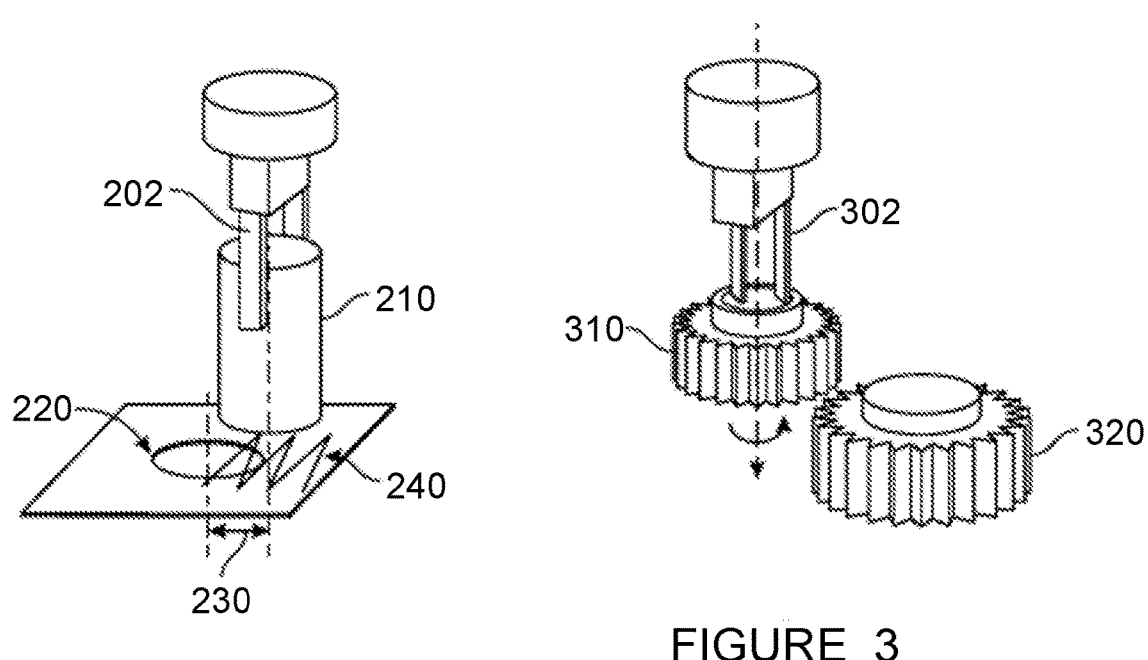
FIGURE 2
FIGURE 3

Offline – Pre-Training

Online – Self-Learning

METHOD FOR ROBOT ASSEMBLY SKILL LEARNING

BACKGROUND

Field

The present disclosure relates generally to a method for robot skill learning and, more particularly, to a method for robot skill learning applicable to high precision assembly tasks employing a compliance controller, where an actor-critic reinforcement learning controller is trained while providing a nominal target position input correction to the compliance controller, and the reinforcement learning controller is used in actor-only mode after training is complete.

Discussion of the Related Art

The use of industrial robots to repeatedly perform a wide range of manufacturing and assembly operations is well known. However, some types of tight-tolerance assembly operations, such as installing a peg into a hole or plugging one part into another, are still problematic for robots to perform. These types of operation are often performed manually because robots have difficulty detecting and correcting the complex misalignments that may arise in tight-tolerance assembly tasks. That is, because of minor deviations in part poses due to both grasping and fixturing uncertainty, the robot cannot simply move a part to its nominal installed position, but rather must "feel around" for the proper alignment and fit of one piece into the other.

In order to make assembly tasks robust to these inevitable positioning uncertainties, robotic systems typically utilize force controllers (aka compliance control or admittance control) where force and torque feedback is used to provide motions commands needed to complete the assembly operation. A traditional way to set up and tune a force controller for robotic assembly tasks is by manual tuning, where a human operator programs a real robotic system for the assembly task, runs the program, and adjusts force control parameters carefully in a trial and error fashion. However tuning and set up of these force control functions using physical testing is time consuming and expensive, since manual trial and error has to be performed. Also, when tuning is performed on real systems, re-design may be required if the real system does not meet requirements. Parameter tuning on real physical test systems is also hazardous, since robots are not compliant, and unexpected forceful contact between parts may therefore damage the robot, the parts, or surrounding fixtures or structures.

Systems exist for tuning force control parameters for robotic assembly in a simulation environment, but these existing systems exhibit several limitations including slowness and lack of robustness. Other existing systems attempt to apply learning functions to a force controller. However, existing imitation learning systems are not robust, and failure data typically overwhelms the demonstration data in the learning controller. Existing reinforcement learning systems take a long time to train, and typically experience many failed trials along the way, with risk of the part damage and hazardous behavior discussed earlier.

In view of the circumstances described above, improved methods are needed for robotic assembly skill learning in tight tolerance applications using compliance controllers.

SUMMARY

The following disclosure describes a method and system for robot skill learning applicable to high precision assembly tasks employing a force or compliance controller. An actor-critic reinforcement learning controller is coupled to the compliance controller, where an actor neural network provides action data in the form of a target position adjustment to the compliance controller based on robot state data feedback, and a critic neural network is used to train the actor neural network. The critic neural network receives the robot state data feedback and reward data from the robot, along with the action data from the actor neural network, and correlates optimal actions associated with states in order to maximize the reward. The critic then adjusts the parameters of the actor so that the actor produces highly effective actions in response to the state data, leading to rapid and reliable completion of the assembly task by the compliance controller/robot system. The critic neural network is no longer used after the actor neural network is adequately trained.

Additional features of the present disclosure will become apparent from the following description and appended claims, taken in conjunction with the accompanying drawings.

BRIEF DESCRIPTION OF THE DRAWINGS

FIG. 1 is an illustration of a robotic assembly operation being performed on tight-tolerance parts, illustrating sources of part positioning uncertainty which create challenges for robotic assembly operations;

FIG. 2 is an illustration of parts being robotically assembled, where the parts require alignment in a manner which causes the robot to perform a hole search in a plane perpendicular to the insertion axis;

FIG. 3 is an illustration of parts being robotically assembled, where the parts require alignment in a manner which causes the robot to perform a phase search to find a proper rotational orientation about the insertion axis;

DETAILED DESCRIPTION OF THE EMBODIMENTS

Figure 4:
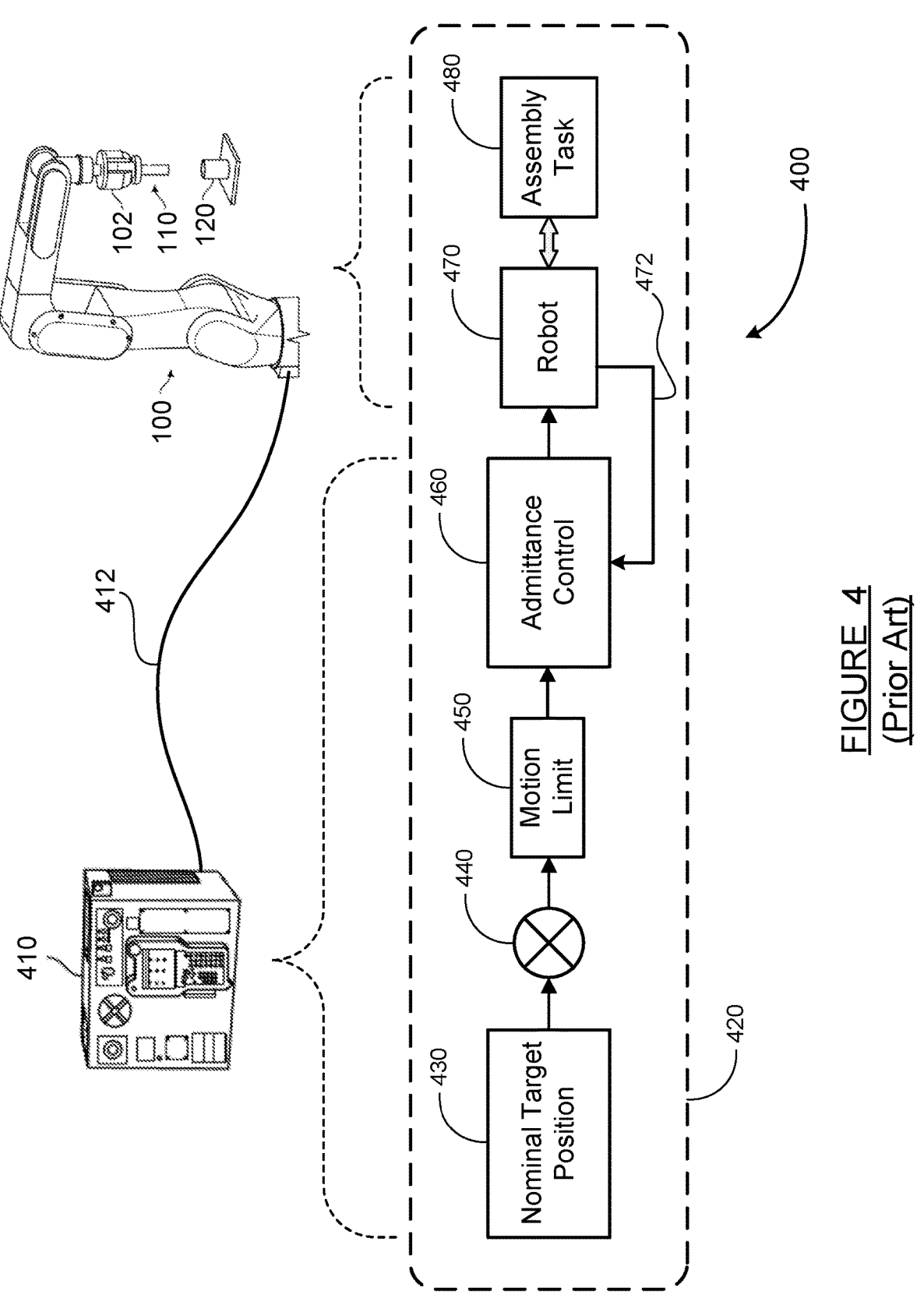
FIG. 4 is a block diagram illustration of a system configured for a robotic assembly operation using a compliance controller (i.e., force or admittance control), as known in the art.

The following discussion of the embodiments of the disclosure directed to a method for robot skill learning using an actor-critic reinforcement learning controller used in actor-only mode after training is merely exemplary in nature, and is in no way intended to limit the disclosed techniques or their applications or uses.

The use of industrial robots for a wide variety of manufacturing and assembly operations is well known. The present disclosure is directed to overcoming the challenges encountered in many robotic assembly operations.

FIG. 1 is an illustration of a robotic assembly operation being performed on tight-tolerance parts, illustrating several sources of part positioning uncertainty which create challenges for robotic assembly operations. A robot 100 having a gripper 102 grasps a first part 110 which is to be assembled with a second part 120. In this example, the first part 110 is a peg part, and the second part 120 is a hole structure. The peg part 110 is to be inserted into a hole in the hole structure 120. The tolerances of the parts in a peg-in-hole assembly are typically quite tight, so that the assembly can operate without excessive looseness after assembled. Some peg-in-hole assemblies have dual coaxial pegs on one part, or dual parallel-axis pegs on one part, which must be simultaneously inserted into dual holes on the other part, which makes the assembly operation even more difficult. Many other types of mating part assemblies—such as electrical connectors, complex planar shapes, etc.—exhibit similarly tight tolerances.

The types of assembly operations described above are often performed manually because robots have difficulty detecting and correcting the complex misalignments that may arise in tight-tolerance assembly tasks. That is, because of minor deviations in part poses, the robot cannot simply move a part to its nominal installed position, but rather must "feel" the alignment and fit of one piece into the other. There are many possible sources of errors and uncertainty in part poses. First, the exact position and orientation (collectively, "pose") of the peg part 110 as grasped in the gripper 102 may vary by a small amount from the expected pose. Similarly, the exact pose of the hole part 120 in its fixture may also vary from the expected pose. In systems where a camera 130 is used to provide images of the workspace scene for location identification, perception error can also contribute to the uncertainty of relative part positioning. In addition, calibration errors in placement of the robot 100 and the fixture holding the part 120 in the workspace, and minor robot joint position variations, can all further contribute to part positioning uncertainty. These factors combine to make it impossible for the robot 100 to simply pick up the peg part 110 and insert it in a single motion into the hole structure 120.

FIG. 2 is an illustration of parts being robotically assembled, where the parts require alignment in a manner which causes the robot to perform a hole search in a plane perpendicular to the insertion axis. A gripper 202 grasps a part 210 which must be inserted into a hole 220 in the same manner as shown in FIG. 1. A distance 230, exaggerated for visual effect, represents the uncertainty in the lateral position of the part 210 relative to the hole 220. In order to find the proper alignment of the part 210 with the hole 220, the robot may be required to perform a hole search, where the gripper 202 moves the part 210 back and forth in a zig-zag pattern 240 in a plane which is perpendicular to the axis of the part 210.

FIG. 3 is an illustration of parts being robotically assembled, where the parts require alignment in a manner which causes the robot to perform a phase (rotational) search to find a proper rotational orientation about the insertion axis. A gripper 302 grasps a first part 310 which must be mated with a second part 320. In this case, the first and second parts 310/320 are gears having teeth which must be precisely aligned. In order to find the proper alignment of the part 310 with respect to the part 320, the robot may be required to perform a phase search, where the gripper 302 finely adjusts the rotational position of the part 310 about its pivot axis while attempting to lower the part 310 into position and engagement with the part 320.

Although the hole search and phase search capabilities described above exist in robotic systems, they can be inefficient, and they are often ineffective when the part assembly involves anything more complex than a simple hole alignment or rotational alignment. The illustrations of FIGS. 1-3 are merely exemplary, and many other types of tight-tolerance installation and assembly tasks exist which are difficult to perform robotically.

In order to make assembly tasks robust to these inevitable positional uncertainties, robotic systems typically utilize force control based functions to "feel" for the proper part fit. A traditional way to set up for robotic assembly tasks is by manual tuning, where a human operator programs a real robotic system for the assembly task, runs the program, and adjusts force control parameters in a trial and error fashion. However, tuning and set up of these force control functions using physical testing is time consuming and expensive due to the manual trial and error which has to be performed. Parameter tuning on real physical test systems is also hazardous, since robots are not compliant, and unexpected forceful contact may damage robots, workpieces, and/or surrounding fixtures or structures.

Systems exist for tuning force control parameters for robotic assembly in a simulation environment, but these existing systems exhibit several limitations. Some of these systems are designed to simulate only one specific type of assembly task—such as one of those shown in FIGS. 1-3—and cannot be applied to general assembly tasks because the techniques include pre-programmed motion strategies which are specific to the particular type of assembly task. Other existing systems for parameter tuning in a simulation environment still require significant human experience and expertise for guiding the selection of force control parameters used in the simulations.

The present disclosure describes methods for robot skill learning using improved reinforcement learning techniques which overcome the drawbacks of existing methods of programming or teaching a robot to perform assembly tasks. One disclosed method uses a reinforcement learning controller pre-trained offline using human demonstration data and update self-trained online with human override action (co-training), and another disclosed method uses an actor-critic reinforcement learning controller which is trained and then used in actor-only mode after training. Both of these disclosed methods are discussed in detail below.

FIG. 4 is a block diagram illustration of a system 400 configured for a robotic assembly operation using a compliance controller (i.e., force or admittance control), as known in the art. In the physical world, a robot controller 410 communicates with a robot such as the robot 100 of FIG. 1. The controller 410 may communicate with the robot 100 via a cable 412 as shown, or wirelessly. The controller 410 provides joint motion commands to the robot 100 and receives state feedback from the robot 100, as known in the art and discussed below. As illustrated in FIG. 1, the robot 100 has the gripper 102 grasping the first part 110, and the controller 410 provides commands with the objective of assembling the first part 110 with (into) the second part 120. The illustrations of the parts 110 and 120 are merely exemplary. Compliance controllers may be used for assembly of any components requiring high precision—such as those of FIGS. 1-3, a dual peg part with a duel hole part, electrical connectors, etc.

A block 420 represents the controller 410 and the robot 100 in block diagram form. The controller 410 is configured as a compliance controller, the functions of which are discussed below. A block 430 provides a nominal target position of the first part 110. The nominal target position could be predefined and unchanging for a particular robot workcell, or the nominal target position could be provided by a vision system based on an observed position of the second part 120, or by some other means. For the sake of this discussion, it is assumed that the position of the second part 120 in the robot workcell is known, and the nominal target position from the block 420 defines the position of the first part 110 to install it into the second part 120. The nominal target position of the first part 110 may of course then be transformed to gripper coordinates, which can then be converted to robot joint positions using inverse kinematics in a known manner.

A summing junction 440 is included after the block 430. Although the junction 440 does not have a second input in FIG. 4, a second input will be added in later figures. A block 450 defines motion limits of the robot 100. The motion limits ensure that the robot 100 does not take an excessively large motion step during the control process, where excessively large motion could create a hazardous situation or result in forceful contact between the robot 100 and/or the parts 110/120 with each other or with other objects in the workcell. If the difference between the target position and the current position is greater than the motion limit, then the motion limit will prevail and limit the size of the step.

A block 460 includes an admittance control function which interacts with the robot in a block 470 performing the assembly task in a block 480. The blocks 470 and 480 represent the physical actions of the robot 100 as it installs the first part 110 into the second part 120. The robot in the block 470 provides state feedback on a line 472 to the admittance control function in the block 460. The state feedback provided on the line 472 includes robot joint states (position/velocity), along with contact forces and torques. Alternately, position and velocity state data may be provided in Cartesian coordinates, which can readily be converted to joint coordinates, or vice versa, via the transformation calculations described above. A force and torque sensor (not shown) is required in the operation of the robot 100 to measure contact forces between the parts 110 and 120, where the force and torque sensor could be positioned between the robot 100 and the gripper 102, between the gripper 102 and the first part 110, or between the second part 120 and its "ground" (fixing device). The contact force and torque can also be measured from robot joint torque sensors or estimated from other signals such as motor currents.

The admittance control function in the block 460 operates in the following manner, as known in the art and discussed only briefly here. Impedance control (or admittance control) is an approach to dynamic control relating force and position. It is often used in applications where a manipulator interacts with its environment and the force-position relation is of concern. Mechanical impedance is the ratio of force output to motion input. Controlling the impedance of a mechanism means controlling the force of resistance to external motions that are imposed by the environment. Mechanical admittance is the inverse of impedance—it defines the motions that result from a force input. The theory behind the impedance/admittance control method is to treat the environment as an admittance and the manipulator as an impedance.

Using the target position from the junction 440 and the motion limit from the block 450, the admittance control function in the block 460 computes a target velocity (in six degrees of freedom) to move the workpiece from its current position to the target position (or the motion limited step size). The admittance control function then computes a command velocity by adjusting the target velocity with a force compensation term, using an equation such as:

$$V = V_d + K_v^{-1} F$$

, where V is the command velocity vector (this equation applies to translational motion), $V_d$ is the target velocity vector, $$K_v^{-1}$$

is the inverse of an admittance gain matrix, and F is the measured contact force vector from the force sensor fitted to the robot or the workpiece. The vectors all include three translational degrees of freedom in this example. A similar equation is used to compute rotational command velocities ω using contact torque feedback.

The command velocities computed as described above are then converted to command joint velocities $\dot{q}_{cmd}$ for all robot joints by multiplying the inverse of a Jacobian matrix J by the transpose of the command velocities vector, as follows: $\dot{q}_{cmd} = J^{-1}[V, \omega]^T$. A low pass filter may also be provided after the computation of the command joint velocities to ensure smoothness and feasibility of the commanded velocities. The computed command joint velocities are provided to the robot, which moves and measures new contact forces, and the target position is again compared to the current position and the velocity calculations are repeated. Using the force feedback and the robot state feedback on the line 472, the admittance control function in the block 460 repeatedly provides motion commands to the robot in the block 470 in attempting to reach the target position from the junction 440.

The elements 430-460 are programmed as an algorithm in the controller 410. The interaction of the controller 410 with the robot 100 occurs via the cable 412 (or wirelessly) in the real world, and this is represented in the block 420 by the forward arrow (motion commands) from the block 460 to the block 470 and the feedback line 472 (joint states and contact forces).

As discussed earlier, traditional compliance control techniques are not effective for all types of assembly tasks. For example, in tight-tolerance assembly operations, the robot in the block 470 may spend a long time in the feedback loop with the admittance control function in the block 460, and may never ultimately complete the assembly task, including the possibility of part damage in the process. This situation may be somewhat alleviated by fine tuning of the impedance/admittance control parameters, but this is only effective in some situations, and only for a particular workpiece assembly operation. The techniques of the present disclosure have been developed to address these shortcomings of existing compliance controllers.

Figure 5:
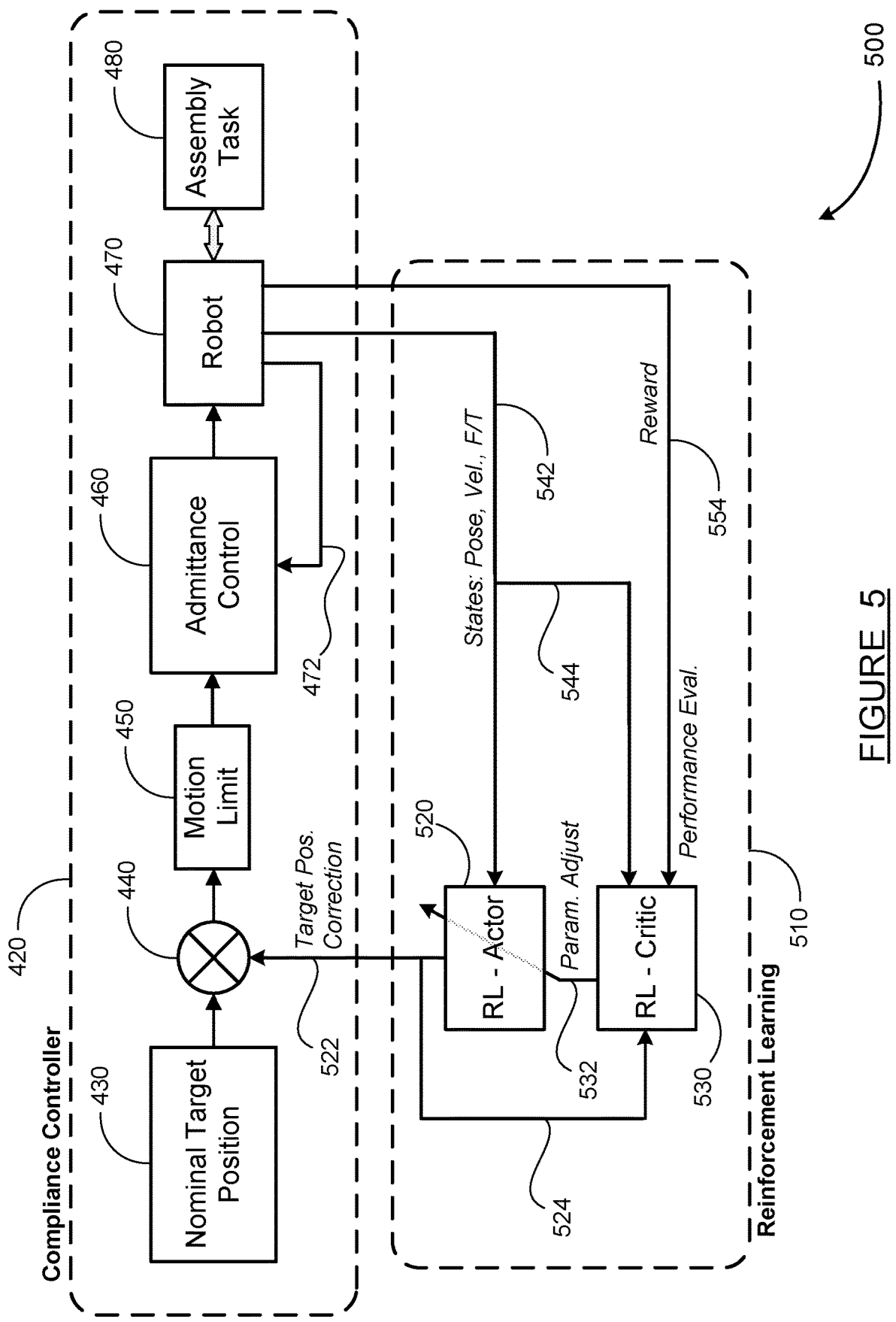
FIG. 5 is a block diagram illustration of a system configured for robotic assembly skill learning, using a compliance controller with an actor-critic reinforcement learning module, according to an embodiment of the present disclosure.

FIG. 5 is a block diagram illustration of a system 500 configured for robotic assembly skill learning, using a compliance controller and robot with an actor-critic reinforcement learning module, according to an embodiment of the present disclosure. At the top of FIG. 5 is the block 420 depicting the compliance controller interaction with the robotic assembly operation, as illustrated in FIG. 4 and discussed above. The depiction of the controller 410 and the robot 100 are omitted from FIG. 5, as the roles of these physical elements corresponding to the compliance control block 420 have already been explained in connection with FIG. 4.

In the technique of the present disclosure, a reinforcement learning module 510 is coupled to the compliance controller/robot system in the block 420. The purpose of the reinforcement learning module 510 is to learn an effective high level motion strategy for the assembly operation and use this strategy to guide the compliance controller/robot system. The specific technique used in the reinforcement learning module 510 is an actor-critic reinforcement learning structure, including an actor block 520 and a critic block 530. FIG. 5 depicts the reinforcement learning module 510 as initially configured in training mode. A later figure depicts how the trained reinforcement learning system is deployed in inference mode for ongoing operations of the compliance controller/robot system.

Figure 6:
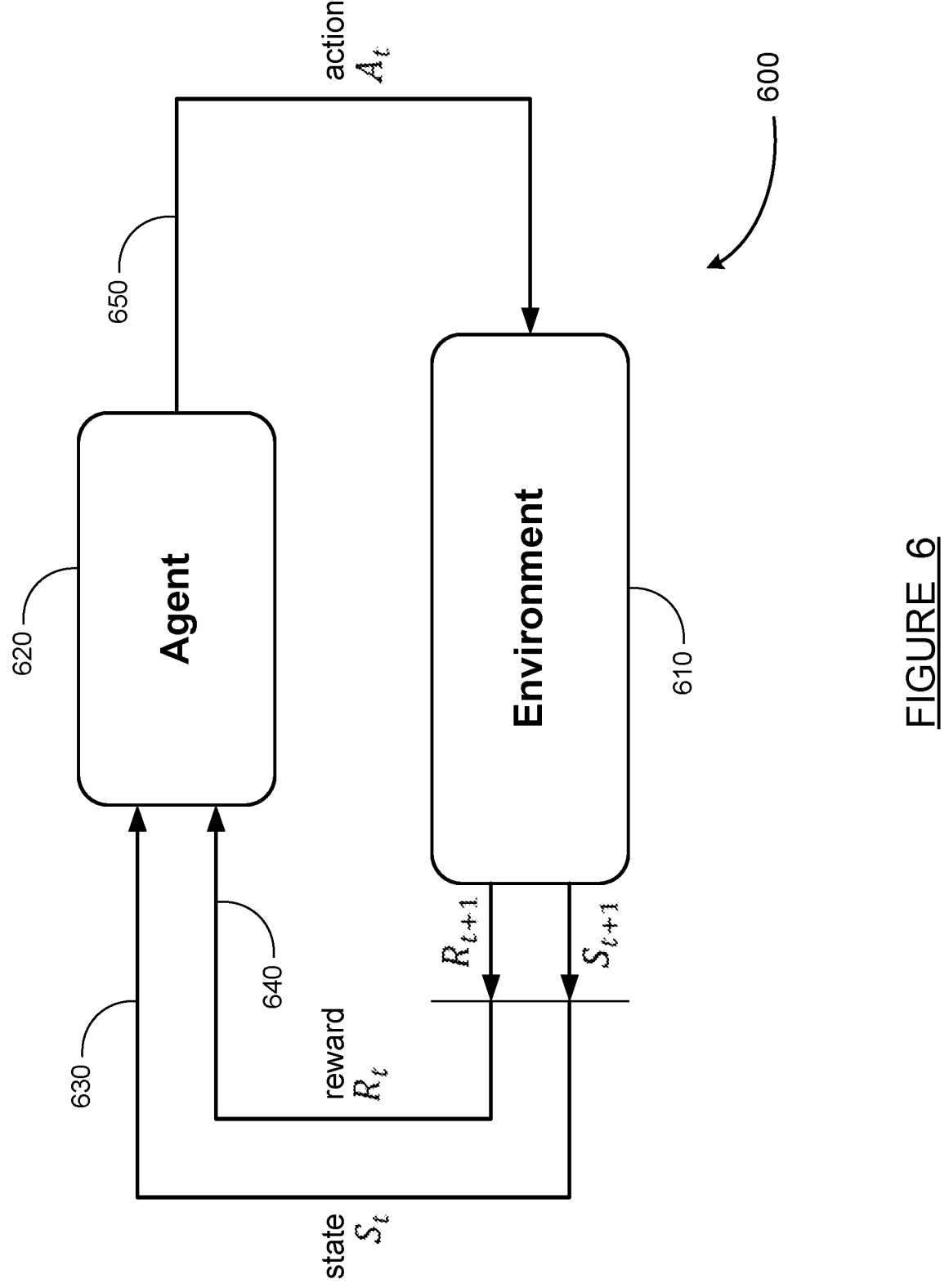
FIG. 6 is a block diagram illustration of a reinforcement learning system, as used in embodiments of the present disclosure.

FIG. 6 is a block diagram illustration of a reinforcement learning system 600, as used in embodiments of the present disclosure. An environment block 610 represents the physical system—in this case, that is a compliance controller/robot performing an assembly task. An agent 620 is the reinforcement learning module. The basic concept of a reinforcement learning system is to observe the operational states of a system, along with the effectiveness of the system, and learn which input actions to the system lead to the best results.

To accomplish this, the agent 620 receives state data $S_t$ (t being a time step) on line 630, and reward data $R_t$ on a line 640. For a robotic system using a compliance controller, the state data $S_t$ includes robot position and velocity states, along with contact forces and torques. The reward data $R_t$ is typically a single numerical value corresponding to the success of the assembly operation or lack thereof. For example, if the compliance controller/robot system fails to install the first part into the second part, the reward may be assigned a small negative value such as $-1$, and if the compliance controller/robot system successfully installs the first part into the second part, the reward may be assigned a large positive value such as 100.

The agent 620 (the reinforcement learning module) may be modelled as a neural network. Upon receiving the state data $S_t$ and the reward data $R_t$, the agent 620 determines an action $A_t$ which is believed to be a most effective input to the system (the environment 610) to perform the assembly operation. In the case of a compliance controller/robot system, the action data $A_t$ is an adjustment to the target position in six degrees of freedom (three orthogonal translations and three rotations). Upon receiving the action data $A_t$, the compliance controller/robot system (the environment 610) executes a next step of attempting the assembly operation, and provides as output a new value of the state data $(S_{t+1})$ and a new value of the reward data $(R_{t+1})$, and the agent 620 then determines a next action based on the new input. This continues until the assembly is successfully completed or ultimately fails.

The agent 620 (the reinforcement learning module) uses the action data, the state data and the reward data to train the neural network to learn the most effective actions for a particular set of state data. This is done by constructing the reinforcement learning problem as having an objective to maximize the cumulative reward while considering randomness, using a formulation such as:

$$\max \ \mathbb{E}\left[\sum_{t=0}^{T} \gamma^t r(s_t, a_t)\right] \tag{1}$$

Where the formulation attempts to maximize the expected cumulative value over an assembly operation (from time t=0 to t=T) of a reward r as a function of a state $s_t$ and action $a_t$, and where $\gamma$ is a discount factor.

In the techniques of the present disclosure, the reinforcement learning system is configured for training using an actor-critic formulation. In an actor-critic formulation, the actor is a stochastic feedback controller (as in FIG. 6 discussed above) which determines an action based on a state using a probability function, and the critic trains the actor to maximize the reward. The actor and critic are approximated by neural networks.

The actor neural network determines an action a based on a policy $\pi$ which is a function of the state s. That is:

$$a \sim \pi(\cdot \mid s) = \mathcal{N}(\mu(s), \sigma^s(s)) \tag{2}$$

Where the actor policy $\pi$ is represented by a Gaussian distribution $\mathcal{N}$ with a mean $\mu$ and a standard deviation $\sigma$. Training of the actor policy involves adjusting the parameters (the mean $\mu$ and the standard deviation $\sigma$) of the probability function to provide an action a which leads to the most effective results as determined by the reward. The actor does not directly use the reward value from the robot/controller, but the actor is trained by the critic which does use the reward.

The critic is a function of state and action called a Q function, which is used in training of the actor. State, action, and reward data are required as input in order to train the critic. The critic neural network Q function is the approximation of cumulative reward (as in Equation (1)), and is trained to minimize a temporal difference as follows:

$$\min[Q(s, a) - (r + \gamma Q(s', a'))]^2 \tag{3}$$

Where Q (s, a) is the critic function Q (of state s and action a), r is the reward for the current step, and the last term is the reward for the next step (s', a') predicted by the Q function using a discount factor ≠ for cumulative reward calculation. The next action is determined by the actor policy; that is, a'~π(·|s').

The actor neural network is then trained to maximize the estimated reward by the critic. To do this, the critic adjusts the parameters (μ, σ) of the actor policy π in order to maximize the value of the Q function:

$$\max Q(s, a) \tag{4}$$

Where the action a is determined by the policy π as defined above in Equation (2).

Using the techniques discussed in the preceding paragraphs and in Equations (1)-(4), the actor and critic neural networks are trained by simply observing and discovering the response of the compliance controller/robot system to inputs, trying various input action strategies as dictated by the probabilistic nature of the actor and critic functions, and learning which action strategies lead to the most successful outcomes. At the very beginning, the neural networks are randomly initialized, and random actions are generated from the actor neural network to drive the robot. At each step in the assembly operation, the state s is measured and an action a is generated by the actor, then the action is evaluated and at the next step s', the step reward r is obtained. The data in one step (s, a, s', r) is recorded to a dataset called a replay buffer and then this process is repeated. There is a maximum allowed number of steps for one assembly operation; if the task succeeds or the maximum step number is reached, the assembly operation is finished. After performing one or several assembly operations, all of the data points (in the form of (s, a, s', r)) are used to update the critic and actor neural networks.

Returning to FIG. 5, and in accordance with the preceding discussion of an actor-critic reinforcement learning system, the actor block 520 and the critic block 530 operate as follows. On a line 522, the actor block 520 provides an action, in the form of a target position correction, to the summing junction 440. The action is determined based on the actor policy, as a function of states provided to the actor block 520 on a line 542. The target position correction from the actor block 520 is also provided to the critic block 530 on a line 524. This is because the critic function requires action data along with state and reward data for its training, as discussed earlier.

The target position correction provided to the summing junction 440 has the effect of changing the target position used by the admittance control block 460, effectively controlling the strategy used by the compliance controller/robot system in performing the assembly operation. The admittance control block 460 interacts with the robot 470 on a relatively high frequency control cycle (e.g., 125 Hz), and the robot 470 provides feedback to the reinforcement learning module 510 on a relatively low frequency control cycle (e.g., 10 Hz). In other words, the inner loop (the admittance control block 460 and the robot 470) runs several or many steps before each step of the outer loop (the reinforcement learning module 510 providing target position correction to the compliance controller/robot in the block 420).

The robot 470 provides the states (robot pose or position, robot velocity, and contact force/torque) to the actor block 520 on the line 542 as mentioned earlier. The states are also provided to the critic block 530 on a line 544, as the critic requires state data. Reward data from the robot 470 (small negative reward if assembly step was unsuccessful, large positive reward if assembly step was successful) is provided to the critic block 530 on a line 554. Thus, the critic block 530 receives all three of the inputs (action, state and reward) which it needs for training. The critic block 530 performs ongoing training of the actor block 520 by way of parameter adjustment (of the actor neural network) on a line 532.

Using the system illustrated in FIG. 5, training of the actor and critic neural networks (in the blocks 520 and 530, respectively) is carried out using all data collected from the compliance controller/robot system during assembly operations in a learning mode. This continues until the performance of the actor block 520 reaches a satisfactory level.

Figure 7:
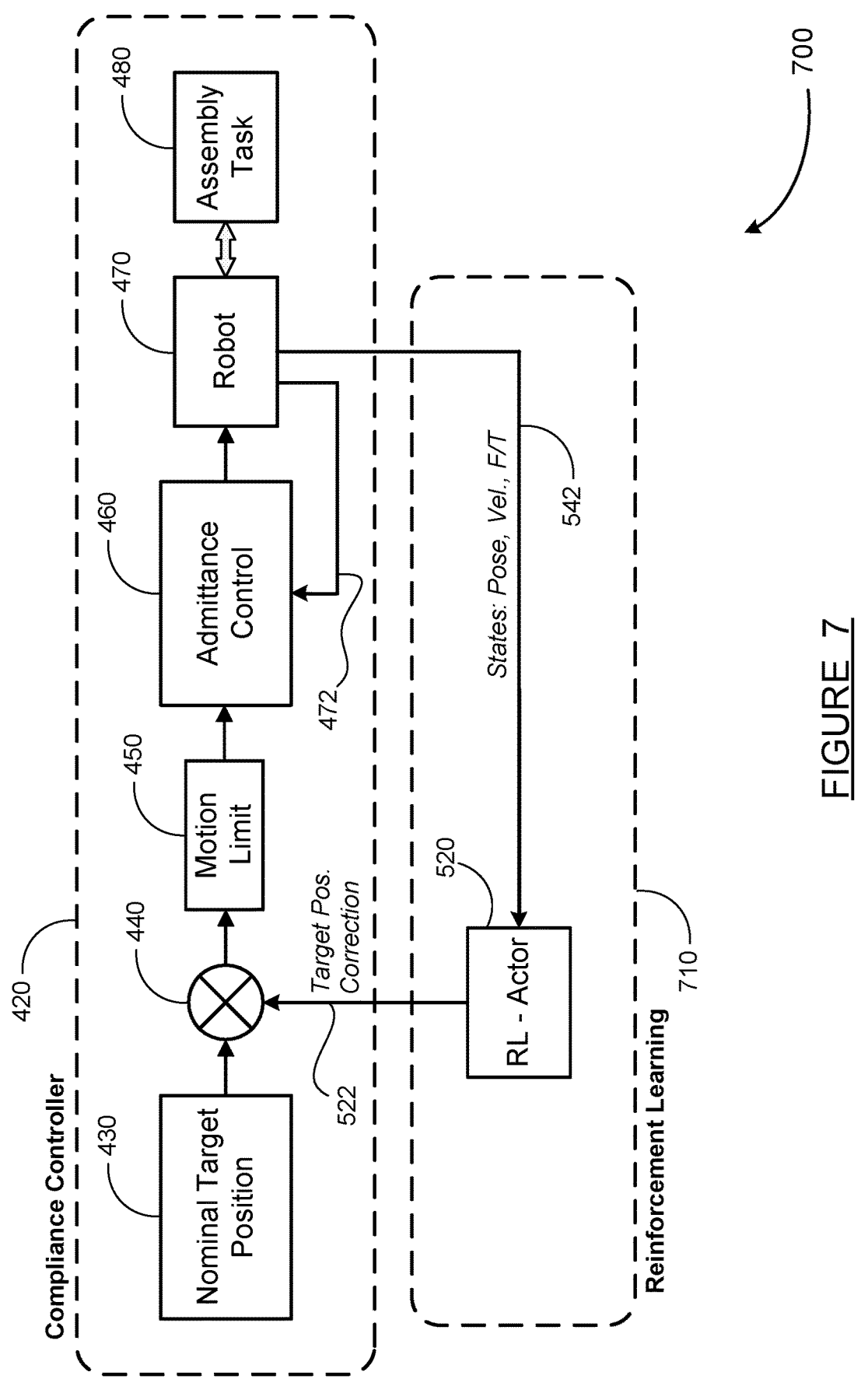
FIG. 7 is a block diagram illustration of a system configured for robotic assembly skill learning, using a compliance controller and robot with a trained actor-only reinforcement learning module, according to an embodiment of the present disclosure.

FIG. 7 is a block diagram illustration of a system 700 configured for robotic assembly skill learning, using a compliance controller and robot with a trained actor-only reinforcement learning module, according to an embodiment of the present disclosure. In FIG. 7, a reinforcement learning module 710 includes only the actor block 520 of FIG. 5. In this case, the actor block 520 (the actor neural network) has been trained as described above to optimize the success of the robotic assembly operation. Thus, the critic is no longer needed, and the parameters of the actor neural network are not further adjusted. FIG. 7 depicts the assembly skill learning system as it is used for actual productive work by the robot 100. As before, the robot 470 provides state data on the line 542 to the actor block 520, which determines an action based on the state data using the policy. The action (target position adjustment or correction) is provided to the summing junction 440 on the line 522.

The system illustrated in FIGS. 5 and 7 (compliance controller/robot system with reinforcement learning module) has been implemented and demonstrated to provide superior performance. For example, in a dual peg/hole installation, a compliance controller/robot with no supplemental control strategy had a success rate of about 43% over an assembly operation time of about 35 seconds (350 attempted motion steps at 10 Hz). The same compliance controller/robot performing the same operation with an unguided supplemental searching strategy (as in FIG. 2) had a success rate of about 83% over an assembly operation time of about 19 seconds (190 attempted motion steps). The same compliance controller/robot performing the same operation with the actor-critic reinforcement learning controller of the present disclosure had a success rate of 100% over an assembly operation time of about 12 seconds (120 attempted motion steps).

In one embodiment, the reinforcement learning module 510/710 is programmed into the robot controller 410 (along with the compliance control algorithm of the elements 430-460). Other implementation embodiments are possible, where the reinforcement learning module 510/710 runs on a computer or cloud server separated from the robot controller 410; for example, the reinforcement learning module 510/710 could be executed on a device which is configured for efficient neural network computation. Another alternative is to train the actor-critic system running on a separate computer, and then incorporate the trained actor-only reinforcement learning controller into the robot controller 410. Any combination of these implementation embodiments may be used as suitable.

Figure 8:
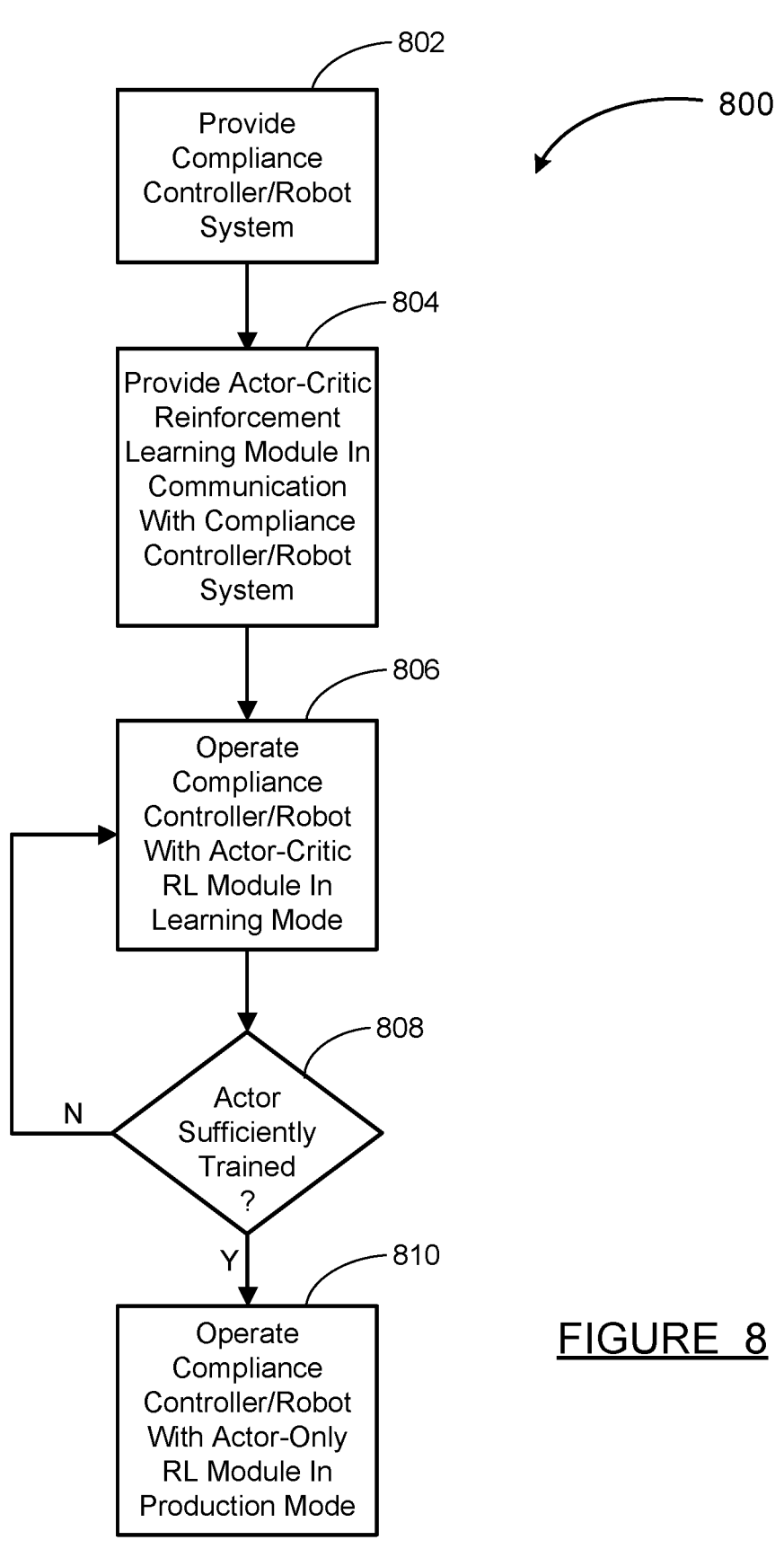
FIG. 8 is a flowchart diagram of a method for robotic assembly skill learning using actor-critic reinforcement learning with a compliance controller/robot system, according to an embodiment of the present disclosure.

FIG. 8 is a flowchart diagram 800 of a method for robotic assembly skill learning using actor-critic reinforcement learning with a compliance controller/robot system, according to an embodiment of the present disclosure. At box 802, a compliance controller/robot system is provided, including an admittance control module controlling a robot performing an assembly task with force feedback used by the admittance control module to determine a next robot motion toward a target position and within a designated motion limit.

At box 804, an actor-critic reinforcement learning module in communication with the compliance controller/robot system is provided. The reinforcement learning module includes an actor neural network which receives state data feedback from the robot and determines an action in the form of a target position correction which is provided as input to the admittance control module. The reinforcement learning module also includes a critic neural network which receives state data feedback and reward data feedback from the robot, along with the action from the actor neural network. The critic neural network uses the action, the state data and the reward data for training to optimize the reward based on the state and action data. The critic neural network also adjusts parameters of the actor neural network to train the actor to provide actions which optimize the reward.

At box 806, the compliance controller/robot system and the reinforcement learning module are operated in a learning mode, where the robot system performs assembly tasks and the reinforcement learning module trains the actor and critic neural networks. At decision diamond 808, it is determined whether the actor neural network has been sufficiently trained to reliably provide successful guidance of the robotic assembly operation. If not, learning mode continues.

At box 810, after the actor neural network demonstrates successful capability, the compliance controller/robot system and an actor-only version of the reinforcement learning module are operated in a production mode, where the robot system performs assembly tasks while being guided by target position corrections from the actor neural network. In the production mode at the box 808, the critic neural network is no longer used, and the actor-only reinforcement learning module is used to provide feedback control to the compliance controller/robot system—with the actor neural network operating in inference mode.

The actor-critic reinforcement learning technique described above provides significantly improved performance in robotic assembly operations using a compliance controller. The actor-critic reinforcement learning technique offers many advantages: it is fast, as it adjusts motion optimally based on force feedback; it is flexible, with no need to design or tune system parameters; it is easy to apply, as the reinforcement learning system learns optimal behavior by self-discovery using the real robotic system, and no model or human tuning are required; and it is a general approach which may be applied to simple or complex tasks.

Another type of assembly skill learning system uses human demonstration of an operation to pre-train a reinforcement learning system, which then performs ongoing training in a self-learning mode with co-training provided by human override as needed to teach optimal behavior. This system is discussed below.

Figure 9:
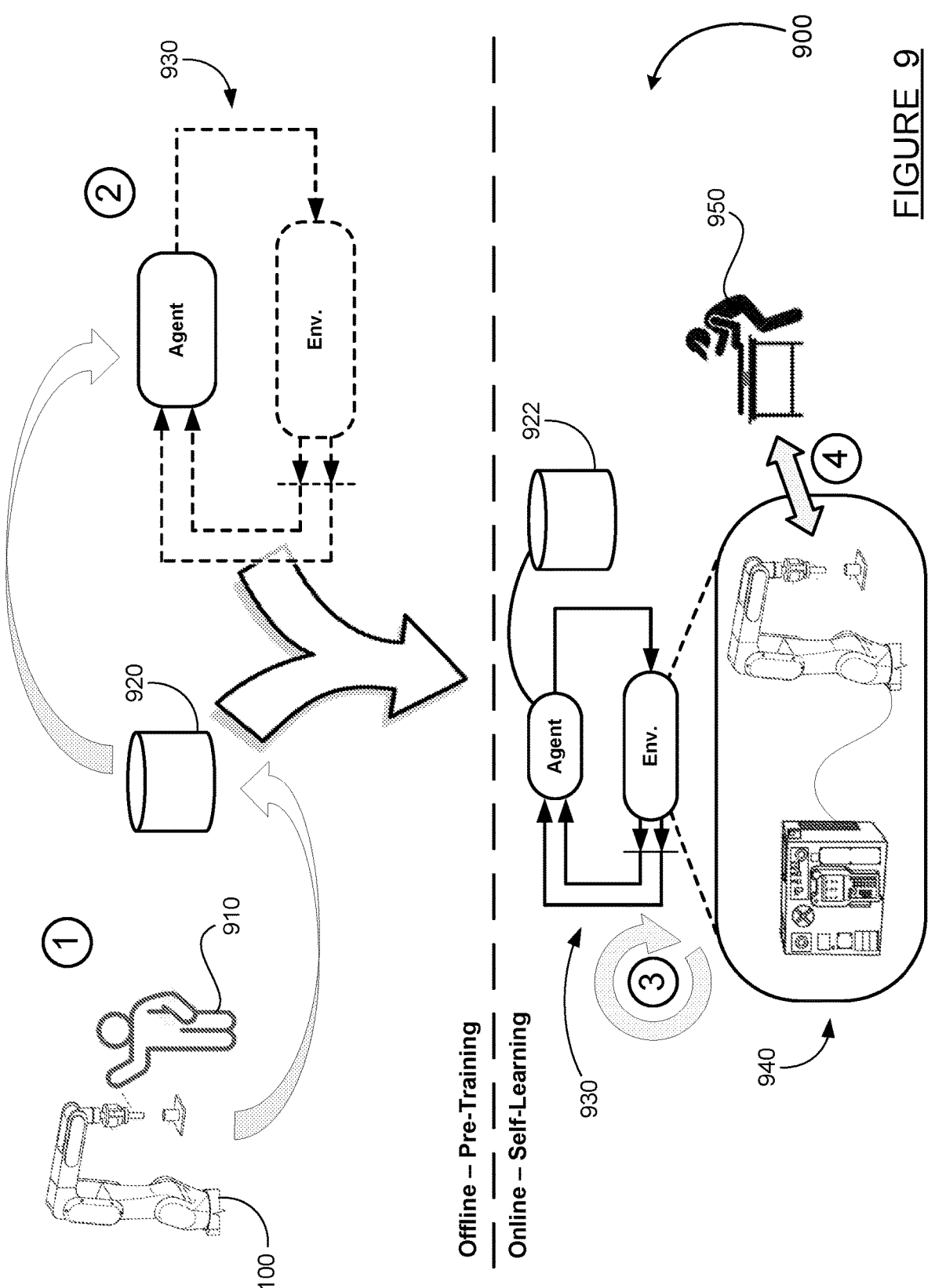
FIG. 9 is a conceptual illustration of a system for robot assembly skill learning combining human demonstration and reinforcement learning-based discovery, according to an embodiment of the present disclosure.

FIG. 9 is a conceptual illustration of a system 900 for robot assembly skill learning combining human demonstration and reinforcement learning-based discovery, according to an embodiment of the present disclosure. A robot such as the robot 100 with a compliance controller is configured to perform an assembly operation, as discussed earlier.

In a first step of the process (see circled number 1), a human operator 910 demonstrates the assembly operation in cooperation with the robot 100. One technique for demonstrating the operation involves putting the robot 100 in a teach mode, where the human 910 either manually grasps the robot gripper and workpiece and moves the workpiece into the installed position in the second workpiece (while the robot and controller monitor robot and force states), or the human 910 uses a teach pendant to provide commands to the robot 100 to complete the workpiece installation. Another technique for demonstrating the operation is teleoperation. In one form of teleoperation, the human 910 manipulates a duplicate copy of the workpiece which the robot 100 is grasping, and the human 910 moves the duplicate workpiece (which is instrumented and provides motion commands to the robot 100) while watching the robot 100, using the visual feedback from the robotic assembly operation and the human's own tactile feel to guide the successful completion of the assembly operation by the robot 100. In another form of teleoperation, the human 910 uses a joystick-type input device to provide motion instructions (translations and rotations) to the robot 100. These or other human demonstration techniques may be used.

The human demonstrator 910 preferably demonstrates the assembly operation several times, so that several complete sets of state and action data, each leading to successful installation, may be collected. The demonstration data (robot motion and force states, and actions, as discussed at length earlier) is collected in a database 920.

In a second step, the demonstration data from the database 920 is provided to a reinforcement learning system 930. The reinforcement learning system 930 includes an agent (a neural network) which learns what actions are effective in correlation to a set of robot and force states, based on reward data. The demonstration data from the database 920 is provided to the reinforcement learning system 930 for pre-training. In this pre-training mode (the second step of the overall process, as indicated by the circled numeral 2), there is no environment interacting with the agent as discussed earlier in connection with FIG. 6. Instead, in the pre-training mode, the agent neural network in the reinforcement learning system 930 is trained purely based on the demonstration data from step one. Thus, the environment block and the feedback lines are all shown as dashed (not used) in the pre-training step.

In a third step of the process, the pre-trained reinforcement learning system 930 and a compliance controller/robot system 940 are placed in an online production mode where self-learning occurs. The compliance controller/robot system 940 may use the same robot 100 as was used for human demonstration, or a separate instance of the same robot configuration. In the online self-learning mode, the compliance controller/robot system 940 repeatedly performs the prescribed installation (assembly operation) in a production mode, with additional control provided by the reinforcement learning system 930. An example of the production (or "online") mode of operation is where the second part is placed into a fixture (possibly by a second robot) or the second part arrives on a conveyor, the robot 100 picks up the first part and installs it into the second part, and the assembled unit moves on for another assembly step or for packaging, and then the process repeats with the next two parts, etc.

As the reinforcement learning system 930 and the compliance controller/robot system 940 perform assembly operations in the third step, more cycles of learning data accumulate and are stored in a database 922. The database 922 initially includes the human demonstration data from the database 920, and data from the ongoing operation in the third step is added to the database 922. The data includes the action, state and reward data needed for training the reinforcement learning system 930, as discussed earlier.

If the assembly operation is not particularly difficult, the reinforcement learning system 930 and the compliance controller/robot system 940 may run indefinitely in the online self-learning mode, with a very high success rate. This would be the case when the installation of the first part into the second part has a fairly loose tolerance, or the parts include geometric features which mechanically guide one part into the other, for example. However, in tight-tolerance assembly operations, some attempted installations may be unsuccessful, and failure data in the database 922 may start to overwhelm the reinforcement learning system 930. That is, when positive reward data is sparse, the neural network in the agent of the reinforcement learning system 930 cannot properly correlate effective actions to given states.

Because of the situation described above, in the techniques of the present disclosure, a fourth step is added for difficult assembly operations. The fourth step is a co-training mode where human correction is provided during the online self-learning mode. The human correction (co-training) phase includes monitoring the success rate of the assembly operations in the online self-learning mode. If the success rate drops below a predefined threshold, or attempted assembly operations exhibit searching behavior which is clearly off-base, then a human operator 950 steps in and interacts with the compliance controller/robot system 940 to override the reinforcement learning system 930. The preferred mode of interaction between the human operator 950 and the compliance controller/robot system 940 is teleoperation, which was discussed above.

By using the human intervention/correction step (co-training) described above, new successful learning cycles are added to the database 922, such that the high reward values provide beneficial update training of the agent neural network in the reinforcement learning system 930 to identify effective actions for given states. The human intervention/correction step may be performed for a period of time, with the human operator 950 monitoring and intervening as necessary to ensure that each attempted assembly operation is successful. After this period of co-training, it would be expected that the reinforcement learning system 930 and the compliance controller/robot system 940 resume autonomous operation in the online self-learning production mode.

Figure 10:
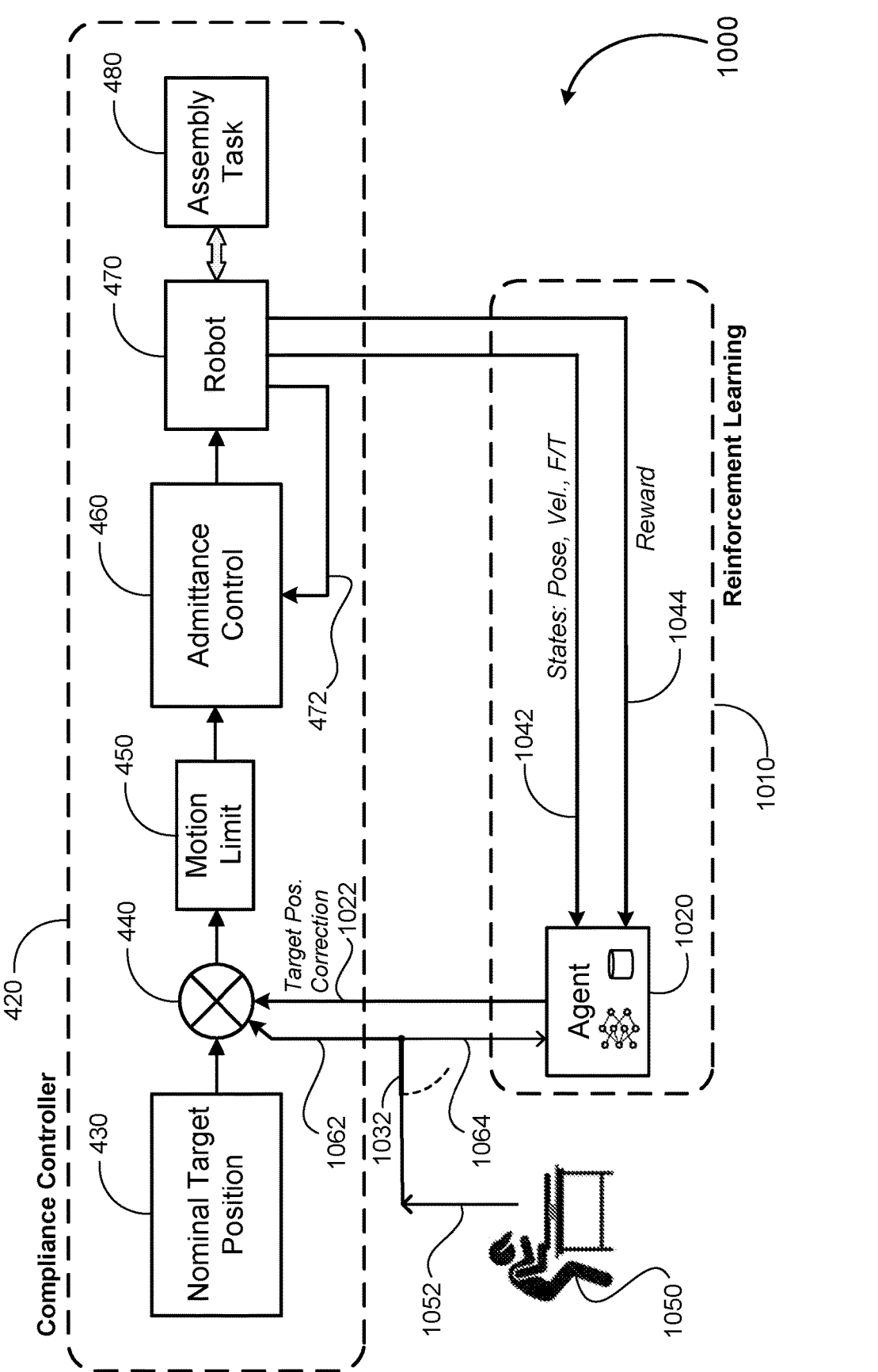
FIG. 10 is a block diagram illustration of a system configured for robotic assembly skill learning, using a compliance controller with a reinforcement learning module, in a co-training mode for human correction during ongoing self-learning, according to an embodiment of the present disclosure.

FIG. 10 is a block diagram illustration of a system 1000 configured for robotic assembly skill learning, using a compliance controller with a reinforcement learning module, in a co-training mode for human correction during ongoing self-learning, according to an embodiment of the present disclosure. The usage of the system 1000 depicted in FIG. 10 for the co-training mode (step 4) discussed above with respect to FIG. 9 is described below.

At the top of FIG. 10 is the block 420 depicting the compliance controller interaction with the robotic assembly operation, as illustrated in FIG. 4 and discussed earlier. In the technique of the present disclosure, a reinforcement learning module 1010 is coupled to the compliance controller/robot system in the block 420. The purpose of the reinforcement learning module 1010 is to learn an effective high level motion strategy for the assembly operation and use this strategy to guide the compliance controller/robot system. The reinforcement learning module 1010 corresponds with the reinforcement learning system 930 of FIG. 9. For the purposes of this discussion, the database 920 and the agent neural network which learns the most effective assembly behavior are considered to be part of the reinforcement learning module 1010, as shown in block 1020 of FIG. 10.

In the same manner as discussed with respect to FIG. 5, the robot 470 provides state feedback (robot position and velocity, and contact force/torque between the parts) on a line 1042 to the block 1020, and reward data (large positive reward for successful assembly; small negative reward for unsuccessful attempt) on a line 1044. The agent block 1020 stores the state data and reward data in the database, and uses the data in training of the agent neural network in the reinforcement learning module 1010.

FIG. 10 depicts the system 1000 as configured for human correction/intervention (co-training), while FIG. 11 (discussed below) shows the same system 1000 as configured for self-learning without human co-training. When configured for human co-training input as in FIG. 10, a human demonstrator 1050 uses a technique such as teleoperation to guide the assembly operation. A "switch" 1032 is positioned to receive motion data from the human demonstration (e.g., teleoperation) provided on a line 1052.

The motion data from the human demonstration is provided to the compliance controller/robot system in the block 420 as target position correction input on line 1062 to the summing junction 440. During human co-training in the online self-learning phase, target position correction is provided both from human demonstration (on the line 1062) and from the reinforcement learning module 1010 (from the agent 1020 on line 1022), where the human demonstration data is preferably weighted higher than the reinforcement learning data. This arrangement enables the human demonstration input to guide the robot during the assembly operation.

The motion data from the human demonstration may also be provided as action data on line 1064 to the agent 1020 in the reinforcement learning module 1010. This connection provides all of the action data which is needed by the agent 1020 in order to learn the correlation between states and actions which lead to successful assembly operations.

Thus, the configuration of FIG. 10 enables two things to happen; first, the human demonstration controls the actual motion of the compliance controller/robot system 420 during co-training; second, action data from the human demonstration is provided to the agent block 1020, which along with the state data and reward data, allows the agent neural network to learn the correlation between states and effective actions.

The system of FIG. 10 could also be used in a simplified form for the human demonstration phase. This may be done because the connections exist from the human demonstrator 1050 to provide input to the compliance controller/robot system 420, and from the robot 470 to provide state and reward feedback to the agent 1020 (which includes the database). If the system 1000 is used for the human demonstration phase (first step of FIG. 9), only the human demonstration input is provided to the compliance controller in the block 420, so the human demonstration exclusively controls the robot motion. Furthermore, the state, reward feedback and human demonstrated action are collected in the database 920 (discussed above), but the agent in the block 1020 does not provide an action to the summing junction 440. After collecting the human demonstration data, offline pre-training of the agent in the block 1020 could then proceed as discussed earlier, without any interaction with the compliance controller/robot system in the block 420.

Figure 11:
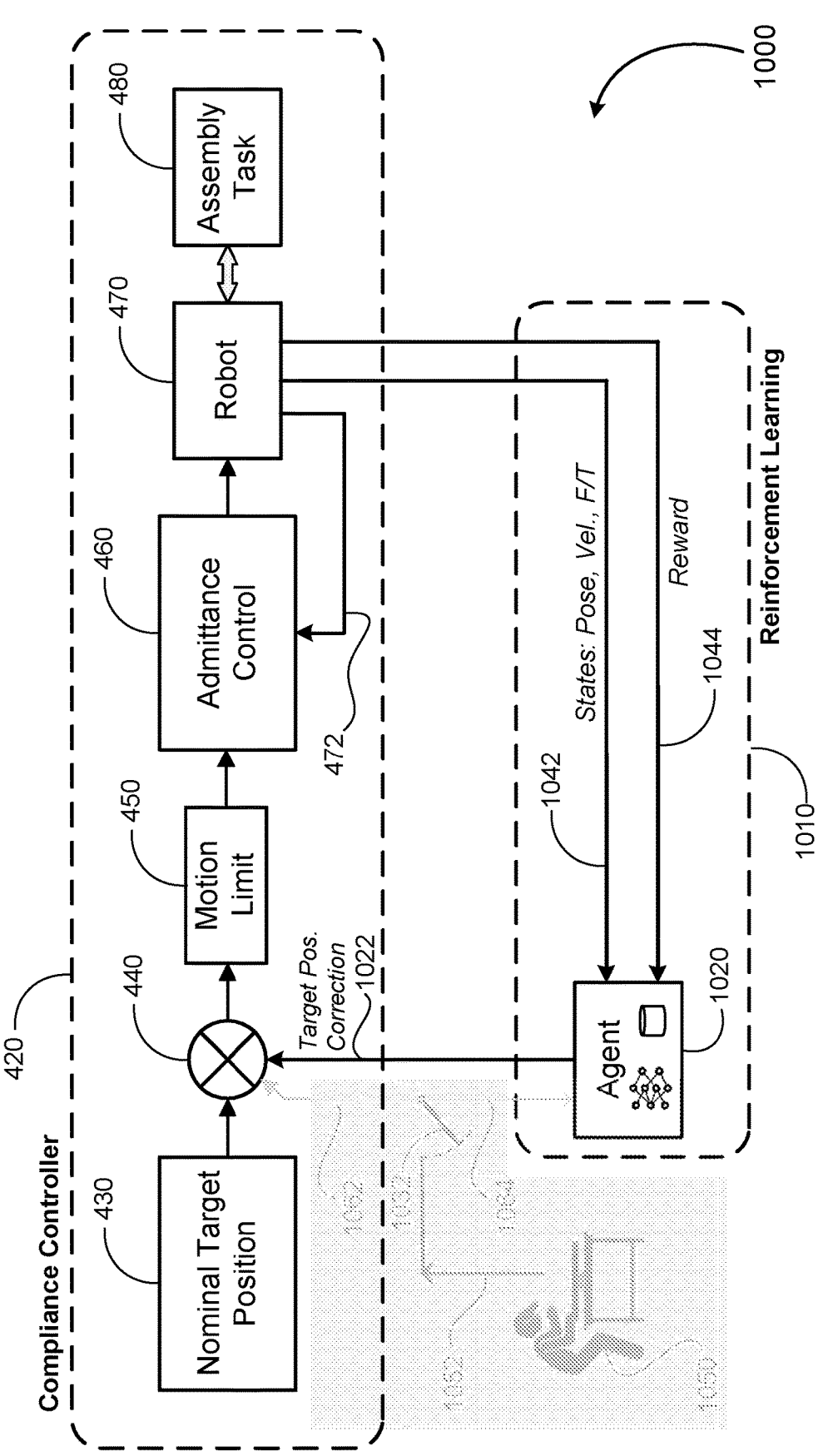
FIG. 11 is a block diagram illustration of a system configured for robotic assembly skill learning, using a compliance controller with a reinforcement learning module, in an online self-learning mode, according to an embodiment of the present disclosure.

FIG. 11 is a block diagram illustration of the system 1000 configured for robotic assembly skill learning, using a compliance controller with a reinforcement learning module, in an online self-learning mode, according to an embodiment of the present disclosure. The system 1000 of FIG. 11 is the same as the system 1000 of FIG. 10 except in a different configuration.

FIG. 11 depicts the system 1000 as configured for autonomous learning without human co-training input. This is the online self-learning performed in the third step of FIG. 9. When configured for autonomous operation with no human demonstration input as in FIG. 11, the human demonstrator 1050 is not needed, the switch 1032 is positioned so as not to receive motion data on the line 1052, and only the action data on the line 1022 now flows to the summing junction 440. No action data is provided to the summing junction 440 on the line 1062, and no action data is provided back to the agent in the block 1020 on the line 1064.

Thus, the configuration of FIG. 11 enables two things to happen for autonomous operation of the reinforcement learning module 1010 with the compliance controller/robot system in the block 420; first, the agent neural network in the block 1020 controls the actual motion of the compliance controller/robot system, in the online self-learning phase; second, action data is inherently known by the agent block 1020, which along with the state data and reward data, allows the agent neural network to continuously learn the correlation between states and effective actions.

The system 1000 in the configurations of FIGS. 10 and 11 therefore provide all of the capability needed for human demonstration, offline pre-training, online self-learning and human correction/intervention (co-training) as illustrated in the four steps of FIG. 9. During online productive operations of the robot, the system 1000 can readily be switched between the configurations of FIGS. 10 and 11—simply by opening or closing the switch 1032—to allow human correction/intervention when needed, and return to autonomous operation of the reinforcement learning module 1010 when appropriate.

The following discussion provides further explanation of the techniques used by the reinforcement learning module 1010 for learning and applying a policy to effectively control the compliance controller/robot system.

The general principles of reinforcement learning were discussed above with respect to FIG. 6. In typical reinforcement learning based approaches, low learning efficiency is a major drawback. Though reinforcement learning is well known for its capability to learn robust policy, the learning process requires a lot of interaction data if no a priori information is provided. When reward data is sparse, and/or for tasks in which the full state space is difficult to discover (e.g., precise insertion task, where there is very low chance to sample actions leading to successful insertion), an unacceptably high amount of interaction data is required to learn a good control policy. In an imitation learning based approach, less interaction data is required. However imitation learning results may be limited to a specific task. Also, the learning result is less robust to task variations since imitation learning does not generalize well to unseen situations.

The techniques of the present disclosure were developed to overcome the shortcomings described above. The first part of the presently disclosed technique uses offline pre-training of the reinforcement learning system. The reason to introduce offline reinforcement learning is that it is much faster than standard reinforcement learning. Standard reinforcement learning approaches require continuous interaction with the "environment" (the compliance controller/robot system) for data collection along with training. Typically the interactive data collection process is much slower than training. It is possible for offline reinforcement learning to perform training on a given dataset (i.e., the demonstration data) without further interactive data collection, and thus offline reinforcement learning takes less time for pre-training.

The working principle of offline reinforcement learning is similar to standard reinforcement learning approaches. However, if standard reinforcement learning approaches are used to train a control policy on a given dataset without further interactive data collection, the training process becomes unstable. During the training process, overestimation of the Q function is inevitable, especially in unseen state-action space. This overestimation leads to blind optimism of unseen action space, and further leads to positive feedback of the overestimation of the Q function in unseen state-action space, which finally causes divergence of the entire training process. In the presently disclosed offline reinforcement learning pre-training, this issue is addressed by introducing an extra constraint to the learning formulation (i.e., either to the critic (Q function) or the actor in an actor-critic reinforcement learning system) to guarantee that the updated policy does not deviate too much from the demonstration dataset.

One example of a constraint on the actor of an actor-critic reinforcement learning system is given as:

$$\max_{a \sim \pi(\cdot|s)} [Q(s, a) - \lambda D_{KL}(\pi(\cdot \mid s) || \pi_{demo}(\cdot \mid s))] \tag{5}$$

In the optimization problem above, the objective function includes a loss function computed by subtracting a divergence term from the reward computed by the Q function. In the presently disclosed technique, the loss function includes a Kullback-Leibler divergence calculation ($D_{KL}$) which is a measure of how one probability distribution [the control policy of the actor, $\pi(\cdot|s)$] is different from a second, reference probability distribution [the training dataset, $\pi_{demo}$ ($\cdot|s$)]. In Equation (5), $\lambda$ is a weighting constant. By subtracting the divergence term from the Q function reward term, the objective function penalizes behavior of the actor control policy $\pi$ which deviates from the training dataset. With this training constraint, overestimation can be avoided and the training process becomes stable on a given dataset.

When the pre-training of the control policy is done using the demonstration data as described above, the training process moves to the self-learning stage (step 3 of FIG. 9). In the self-learning stage, the robot further interacts with the assembly task for evaluation of control performance and data collection. The collected interaction data is further utilized to fine-tune the control policy in the agent neural network for performance improvement. In this stage, the human operator (950, 1050) is able to further assist the learning process by providing correction or guidance (co-training), as illustrated in FIGS. 9 and 10. For a task with process uncertainty, it is not possible for the limited human demonstration (step 1) to cover all task variations. Thus, the pre-trained controller may perform poorly if a task variation is not covered in the demonstration dataset. In this situation, the standard reinforcement learning training progress relies on random discovery, and lots of random trials are needed. In the techniques of the present disclosure, a self-learning mode (co-training) is included. In co-training mode, the human operator is able to override the robot command if a poor action is generated by the learning controller during the self-learning stage. With this guidance mechanism, proper state-action pairs can be recorded in the training dataset with less interaction and the learning controller can learn to improve its performance within a short time.

Using the techniques described above, the systems depicted in FIGS. 9-11 have been demonstrated to produce dramatically improved performance relative to standard or naïve reinforcement learning approaches and also relative to traditional imitation learning approaches. Using the techniques of the present disclosure, robotic assembly operations on a variety of workpiece shapes have been demonstrated to have higher success rates and shorter cycle times than the same operations performed using prior art methods.

Figure 12:
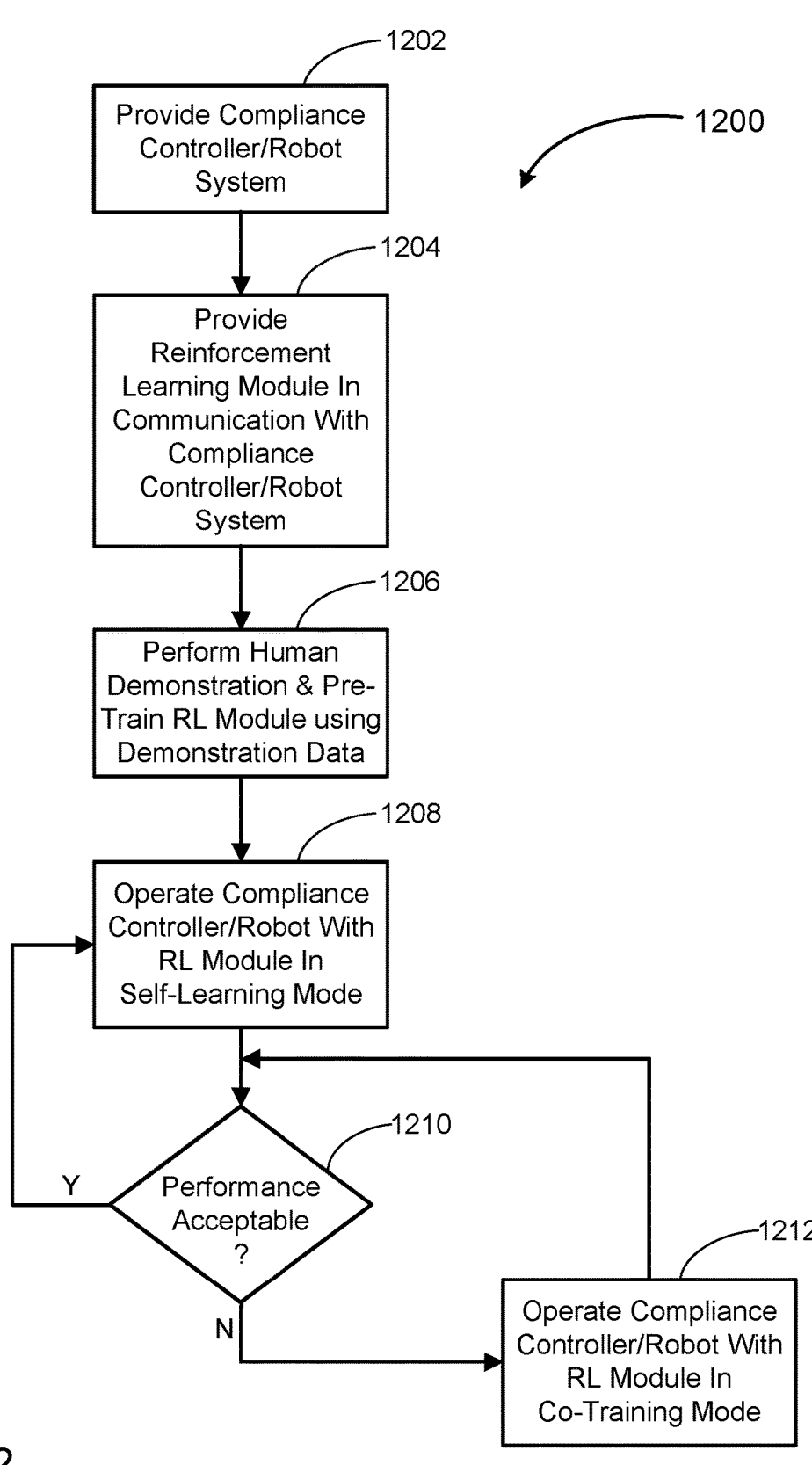
FIG. 12 is a flowchart diagram of a method for robotic assembly skill learning using a reinforcement learning controller with a compliance controller/robot system, including offline pre-training using human demonstration data and online self-learning with human co-training, according to an embodiment of the present disclosure.

FIG. 12 is a flowchart diagram 1200 of a method for robotic assembly skill learning using a reinforcement learning controller with a compliance controller/robot system, including offline pre-training using human demonstration data and online self-learning with human co-training, according to an embodiment of the present disclosure. At box 1202, a compliance controller/robot system is provided, including an admittance control module controlling a robot performing an assembly task with force feedback used by the admittance control module to determine a next robot motion toward a target position within a designated motion limit.

At box 1204, a reinforcement learning module in communication with the compliance controller/robot system is provided. The reinforcement learning module includes at least one neural network which receives state data feedback from the robot and determines an action in the form of a target position correction which is provided as input to the admittance control module. The reinforcement learning module also receives reward data feedback from the robot. The neural network in the reinforcement learning module (or the two neural networks in an actor-critic system) uses the state data and the reward data for training to optimize the reward based on the state data and corresponding action data.

At box 1206, human demonstration of the prescribed assembly operation is performed and pre-training of the reinforcement learning module is completed using the data from human demonstration. The box 1206 represents the first and second steps (the top half) of FIG. 9. As discussed earlier, several repetitions of the human demonstration are preferably performed, with the action, state and reward data captured in the demonstration database 920. The demonstration data in the database 920 is then used to perform initial pre-training of the reinforcement learning agent, without any interaction with the compliance controller/robot system. The pre-training includes using an optimization objective function which constrains the neural network in the reinforcement learning controller to behavior as defined in the demonstration data.

At box 1208, the compliance controller/robot system with the reinforcement learning module is placed online in self-learning mode. This is the third step of FIG. 9, where the robot with compliance controller repeatedly performs the assembly operation with additional feedback control by the reinforcement learning system 930. In the self-learning mode at the box 1208, the agent neural network in the reinforcement learning module continues to learn as data (action, state, reward) is collected in the database 922 (with initial data from the database 920). This self-learning mode was also depicted in FIG. 11, using the reinforcement learning module 1010 providing feedback control to the compliance controller/robot system in the block 420.

At decision diamond 1210, it is determined whether the performance of the compliance controller/robot system with the reinforcement learning module is acceptable. The performance is evaluated by a series of assembly operations, and key performance index is measured. The performance index can be designed to include combinations of operation success rate, operation cycle time, and other factors determined by the operator. If performance is acceptable, online operations continue in self-learning mode at the box 1208.

If performance is not acceptable at the decision diamond 1210, then online operations switch to co-training mode at box 1212. Co-training—where the human operator uses teleoperation to override the input to the compliance controller/robot system—was depicted in the fourth step of FIG. 9 and also in FIG. 10. During co-training, the reinforcement learning module receives the necessary action, state and reward data to continue learning, and the reinforcement learning module may also contribute a small amount of input to the compliance controller/robot system. The co-training by the human operator may continue for several assembly operations and/or for a certain period of time, at which point the performance of the system in self-learning mode is again evaluated at the decision diamond 1210. As discussed earlier, the co-training phase at the box 1212 produces high-reward training data from successful assembly operations, thereby providing additional training of the neural network in the reinforcement learning module to build the correlation between states and effective actions.

The system of FIGS. 9-11, combining imitation learning (by human demonstration) and reinforcement learning (self-learning with human correction, or co-training), provides many advantages in robot skill learning. The system is flexible—being generally applicable to many different part types and shapes without modification. The system is also easy and intuitive—requiring no programming or delicate fine-tuning of parameters. The system can be applied to relatively simple assembly tasks where little or no human intervention will be needed for ongoing self-learning operations, and/or to tight-tolerance difficult assembly tasks where the use of human correction/intervention as needed ensures the necessary high success rates.

Throughout the preceding discussion, various computers and controllers are described and implied. It is to be understood that the software applications and modules of these computers and controllers are executed on one or more computing devices having a processor and a memory module. In particular, this includes a processor in the robot controller 410 which controls the robot 100 performing the robotic assembly task as shown in FIG. 4, and the robot controllers and optional other computers which execute the functions of the compliance controller block 420 and the various reinforcement learning modules depicted in FIGS. 4-11.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for robotic assembly skill learning, said method comprising:
   providing a robot controlled by a compliance controller, the robot being configured to perform an assembly operation where the robot moves a first part into an assembled position with a second part;
   providing a reinforcement learning controller in communication with the compliance controller and the robot, said reinforcement learning controller having an actor module and a critic module, where the actor module includes a neural network which defines a policy for determining an action in response to state data received as feedback from the robot, and the critic module includes a neural network which optimizes a critic function correlating the state data to the action in order to maximize reward data received as feedback from the robot;

operating the robot to perform the assembly operation with the reinforcement learning controller in a learning mode, where the actor module provides the action as input to the compliance controller and the critic module updates parameters of the policy of the actor module based on the critic function, until the actor module demonstrates a predefined performance level of the assembly operation; and operating the robot to perform the assembly operation with the reinforcement learning controller in a production mode, where the actor module provides the action as input to the compliance controller and the critic module is no longer used.

2. The method according to claim 1 wherein the action is a target position adjustment including three translations and three rotations, of the first part relative to the second part, which is provided to the compliance controller.

3. The method according to claim 2 wherein the target position adjustment is combined with a nominal target position, bounded by a predefined motion limit, and used as the input to the compliance controller.

4. The method according to claim 1 wherein the state data includes robot positions and velocities each including three translational and three rotational components, and part-to-part contact forces and torques each in three directions.

5. The method according to claim 1 wherein the reward data includes a positive value when the assembly operation is successfully completed and a negative value when the assembly operation is not successfully completed, and the positive value has a magnitude greater than the negative value.

6. The method according to claim 1 wherein the policy defined by the neural network in the actor module is a statistical distribution of actions relative to states, where the statistical distribution is defined by the parameters including a mean and a standard deviation.

7. The method according to claim 6 wherein the parameters of the policy in the actor module are fixed when the reinforcement learning controller is operated in the production mode.

8. The method according to claim 6 wherein training of the actor module by the critic module includes using an optimization computation which determines desired actions which maximize the reward calculated by the critic function, and adjusting the parameters of the policy in the actor module based on the desired actions.

9. The method according to claim 1 wherein the critic function computes a reward for a current state and a current action as equal to a current actual reward plus a term including a weighted expected reward for a future state and a future action.

10. The method according to claim 1 wherein the compliance controller includes an admittance control routine which computes robot command velocities using a calculation with a first term including a difference between a current robot position and a target position adjusted by the reinforcement learning controller, and a second term including an inverse of an admittance gain matrix multiplied by a contact force vector.

11. The method according to claim 1 wherein the compliance controller controls the robot in a feedback loop having a first cycle frequency, the reinforcement learning controller controls the compliance controller in a feedback loop having a second cycle frequency, and the first cycle frequency is higher than the second cycle frequency.

12. The method according to claim 1 wherein the compliance controller and the reinforcement learning controller are both executed on a robot controller device which provides joint motion commands to the robot and receives the state data as feedback from the robot.

13. A robotic assembly skill learning system, said system comprising:

a robot controlled by a compliance controller, the robot being configured to perform an assembly operation where the robot moves a first part into an assembled position with a second part; and a reinforcement learning controller in communication with the compliance controller and the robot, said reinforcement learning controller having an actor module and a critic module, where the actor module includes a neural network which defines a policy for determining an action in response to state data received as feedback from the robot, and the critic module includes a neural network which optimizes a critic function correlating the state data to the action in order to maximize reward data received as feedback from the robot, where the robot performs the assembly operation with the reinforcement learning controller in a learning mode, where the actor module provides the action as input to the compliance controller and the critic module updates parameters of the policy of the actor module based on the critic function, until the actor module demonstrates a predefined performance level of the assembly operation, and where the robot performs the assembly operation with the reinforcement learning controller in a production mode, where the actor module provides the action as input to the compliance controller and the critic module is no longer used.

14. The system according to claim 13 wherein the state data includes robot positions and velocities each including three translational and three rotational components, and part-to-part contact forces and torques each in three directions, and the reward data includes a positive value when the assembly operation is successfully completed and a negative value when the assembly operation is not successfully completed.

15. The system according to claim 13 wherein the policy defined by the neural network in the actor module is a statistical distribution of actions relative to states, where the statistical distribution is defined by the parameters including a mean and a standard deviation, and where the parameters of the policy in the actor module are fixed when the reinforcement learning controller is operated in the production mode.

16. The system according to claim 15 wherein training of the actor module by the critic module includes using an optimization computation which determines desired actions which maximize the reward calculated by the critic function, and adjusting the parameters of the policy in the actor module based on the desired actions.

17. The system according to claim 13 wherein the action is a target position adjustment including three translations and three rotations, of the first part relative to the second part, which is provided to the compliance controller, and where the target position adjustment is combined with a nominal target position, bounded by a predefined motion limit, and used as the input to the compliance controller.

18. The system according to claim 13 wherein the compliance controller controls the robot in a feedback loop having a first cycle frequency, the reinforcement learning controller controls the compliance controller in a feedback loop having a second cycle frequency, and the first cycle frequency is higher than the second cycle frequency.

19. The system according to claim 13 wherein the compliance controller and the reinforcement learning controller are both executed on a robot controller device which provides joint motion commands to the robot and receives the state data as feedback from the robot.

20. A robotic assembly skill learning system, said system comprising:

a robot controlled by a compliance controller, the robot being configured to perform an assembly operation; and a reinforcement learning controller in communication with the compliance controller and the robot, said reinforcement learning controller having an actor module and a critic module, where the actor module defines a policy for determining an action in response to state data received as feedback from the robot, and the critic module optimizes a critic function correlating the state data to the action in order to maximize reward data received as feedback from the robot, where the robot first performs the assembly operation with the reinforcement learning controller in a learning mode, where the actor module provides the action as input to the compliance controller and the critic module updates parameters of the policy of the actor module, and the robot then performs the assembly operation with the reinforcement learning controller in a production mode, where the critic module is no longer used.

* * * * *